United States Patent [19]

Haferl

[11] Patent Number: 5,287,042
[45] Date of Patent: Feb. 15, 1994

[54] DISPLAY ASPECT RATIO ADAPTATION

[75] Inventor: Peter E. Haferl, Adliswil, Switzerland

[73] Assignee: RCA Thomson Licensing Corporation, Princeton, N.J.

[21] Appl. No.: 934,377

[22] Filed: Aug. 24, 1992

[30] Foreign Application Priority Data

Aug. 28, 1991 [GB] United Kingdom ............... 9118425

[51] Int. Cl.$^5$ .................... G09G 1/04; H01J 29/70
[52] U.S. Cl. ........................... 315/370; 315/408
[58] Field of Search .............. 315/370, 371, 408, 411, 315/395

[56] References Cited

U.S. PATENT DOCUMENTS

| | | | |
|---|---|---|---|
| 4,081,852 | 1/1989 | Kashiwagi | 315/400 |
| 4,516,058 | 5/1985 | Haferl | 315/370 |
| 4,547,708 | 10/1985 | Haferl | 315/371 |
| 4,588,929 | 5/1986 | Wedam et al. | 315/395 |
| 4,695,774 | 9/1987 | Gent et al. | 315/408 |
| 4,705,993 | 11/1987 | Kashiwagi | 315/408 |
| 4,709,193 | 11/1987 | Dietz | 315/408 |
| 4,761,586 | 8/1988 | Wharton | 315/408 |
| 4,859,915 | 8/1989 | DeCraemer | 315/371 |

*Primary Examiner*—Gregory C. Issing
*Attorney, Agent, or Firm*—Joseph S. Tripoli; Joseph J. Laks; Francis A. Davenport

[57] ABSTRACT

A selectable aspect ratio raster is generated on a CRT with a 16:9 aspect ratio screen by a deflection yoke and deflection amplifier. The deflection amplifier is coupled in a non-floating configuration to the deflection yoke. This permits a switching arrangement to control the horizontal deflection amplitude by the selectable addition of inductance in series, with the yoke. The switching arrangement also controls other deflection circuit parameters to provide optimum raster correction at the selected aspect ratio.

20 Claims, 3 Drawing Sheets

DISPLAY ASPECT RATIO ADAPTATION

FIELD OF THE INVENTION

This invention relates to the field of deflection current control and the display of mixed aspect ratio images without geometrical distortion or loss of image content or line time image compression.

BACKGROUND OF THE INVENTION

The introduction of 16:9 aspect ratio picture tubes requires a method to adapt the display width and height to the format of the picture to be displayed. In particular, when a 4:3 aspect ratio picture is displayed on a 16:9 picture tube, the display width must be reduced. This may be achieved by appropriate digital video signal processing or simply by reducing the deflection current amplitude. A reduction of horizontal scan width obviates the requirement to digital process (shrink) the 4:3 aspect ratio signal prior to display with a 16:9 aspect ratio tube.

The inventive arrangements described herein teach a switching arrangement which reduces the horizontal scan width by 25%, this being the reduction required to permit the display of a 4:3 aspect ratio video source, without geometrical distortion, on a 16:9 video display.

The circuit takes advantage of a raster corrected horizontal deflection circuit with grounded yoke. This circuit arrangement provides a low cost solution in which a single transistor switch controls all deflection parameters, for example deflection current amplitude, retrace time, raster correction and "S" shaping.

SUMMARY OF THE INVENTION

A cathode ray tube display system comprises a CRT and yoke attached thereto, coupled to a deflection means for generating deflection current therein to scan a raster on the tube screen. At least two selectable deflection conditions are provided. In a first condition a raster is generated having a deflection amplitude and a deflection correction parameter corresponding to a first aspect ratio. In a second selectable condition a raster is produced having a deflection amplitude and a deflection correction parameter corresponding to a second aspect ratio.

In a further inventive feature, the deflection means drives a yoke coupled in shunt to ground, to provide a simple method of aspect ratio adaptation by deflection amplitude and deflection correction parameter control.

A further inventive feature provides additional deflection correction parameters which are also selectable providing deflection correction specific to the selected aspect ratio.

DETAILED DESCRIPTION OF THE PREFERRED EMBODIMENTS

Figure 1A:
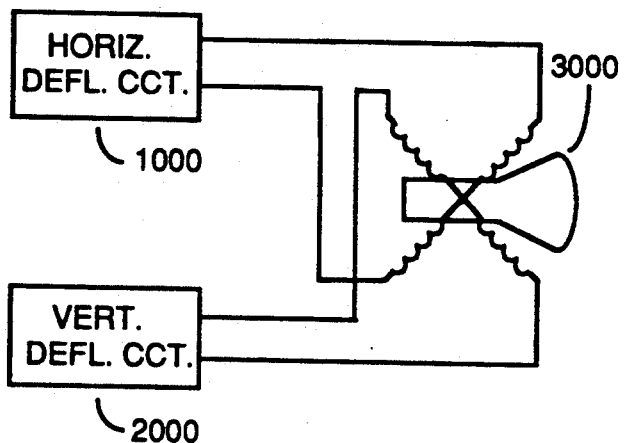
FIG. 1A is a block diagram showing a tube, yoke and deflection system.
Figure 1B:
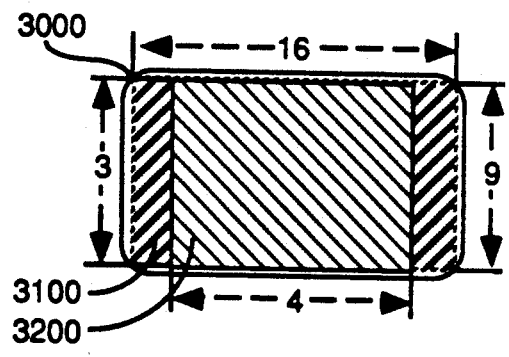
FIG. 1B shows a 16:9 aspect ratio CRT display surface with both 16:9 and 4:3 aspect ratio rasters.

FIG. 1A is a block diagram showing a cathode ray tube 3000, such as a VideoColor 16:9 picture tube type A86 ECT 13×10 with a horizontal deflection winding that is driven by a horizontal deflection circuit 1000, operating at twice horizontal frequency as required for progressive scan display. A vertical deflection circuit is shown in 2000 is coupled to a vertical deflection winding. FIG. 1B depicts the display surface of C.R.T. 3000 and shows two raster widths. A 16:9 aspect ratio raster is depicted by element 3100, and element 3200 shows a 4:3 aspect ratio raster.

Figure 2:
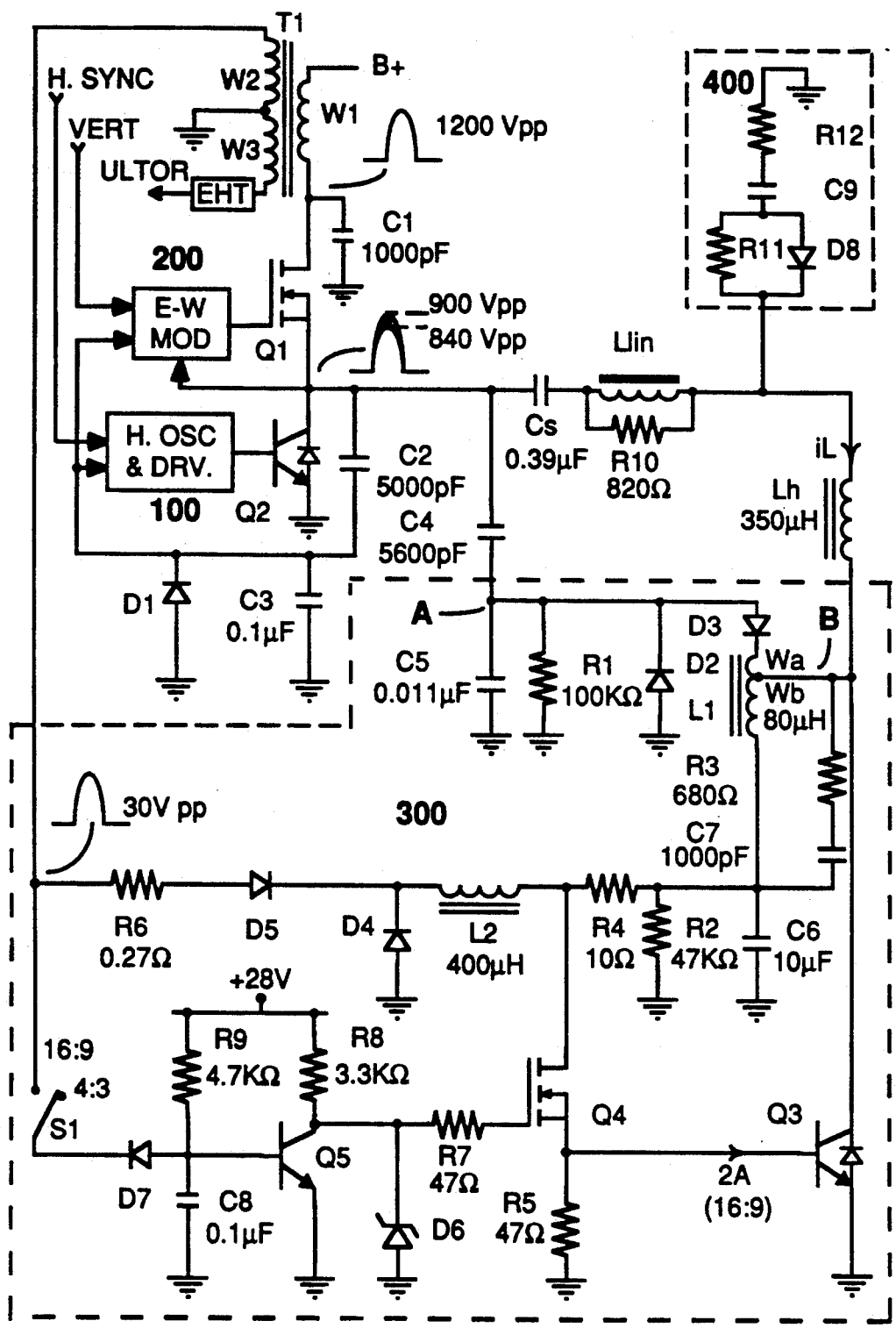
FIG. 2 is circuit diagram of a raster corrected horizontal deflection circuit according to an inventive arrangement of the scan adaptation circuit described herein.

In FIG. 2, a horizontal oscillator 100, is phase locked to an input video horizontal sync signal and a driver stage is coupled to the base of output transistor Q2. The collector of transistor Q2 is connected to a B+ power supply via a series combination of an E-W switching MOS transistor Q1 and the primary winding $W_1$, of flyback transformer T1. Transistor Q2 collector terminal is also connected to an input of the E-W control circuit 200, and capacitors C2, C3, C4 and C5 which determine the deflection retrace time. The operation of the E-W control circuit 200, is described fully in U.S. Pat. No. 5,115,171. Transistor Q2 collector is also coupled to the deflection yoke $L_h$, via capacitor $C_s$ which produces "S" shaping correction, and a linearity coil $L_{lin}$, which is shunted by a resistor R10. The deflection yoke $L_h$ is coupled to ground by transistor Q3 when displaying 16:9 format raster. To display a 4:3 aspect ratio image, winding $W_b$ of auto transformer $L_1$ is connected in series yoke $L_h$ and with capacitor C6 providing an AC ground. Transistor Q1 supplies the required energy from the primary winding of T1 to the deflection circuit during a variable portion of the first half of retrace and is turned off during the rest of retrace. Thus the retrace voltage across Q2 is controlled by Q1. The flyback transformer retrace time is therefor determined by capacitor C1. The deflection circuit and flyback transformer are chosen to have the same retrace time, of 5.8 μsec. Flyback transformer T1 has two secondary windings, winding $W_2$ generates base drive current and a control voltage for the scan adaptation circuit 300 and winding $W_3$ provides retrace pulses for the ultor power supply, EHT. The isolation provided by the E-W correction circuit, between the flyback transformer and the output transistor Q2, renders the ultor supply EHT, substantially immune to deflection system perturbations, for example, changes of deflection amplitude.

A yoke retrace voltage sample is provided by a capacitive voltage divider formed by capacitors C2 and C3 coupled between the collector of Q2 and ground. This voltage sample is clamped to ground by diode D1 and is fed back to the horizontal oscillator to provide an input for synchronizing the oscillator to the video signal horizontal sync. The use of the yoke retrace pulse as a phase locking input for the horizontal oscillator eliminates beam current related phase modulation of the horizontal oscillator. The clamped yoke retrace voltage pulse also provides a feedback signal for the E-W control circuit. The E-W control circuit is coupled to a vertical rate waveform which is shaped to produce various wave shapes appropriate for deflection distortion correction. The E-W control circuit modulates the turn-off instant of transistor Q1 with the processed vertical rate waveform. Thus the energy flowing into the deflection circuit is amplitude modulated, which in turn results in modulation of the retrace voltage across transistor Q2, and the deflection current in the yoke. Hence E-W raster distortions, such as, pincushion or trapezium distortion are corrected.

The scan adaptation circuit 300, comprises a transistor switch Q3, coupled to an auto-transformer L1. The auto-transformer L1 has two windings, winding $W_b$ constitutes a yoke extension coil, or inductor, and winding $W_a$, forms a step-up auto-transformer. Capacitor C6 provides a low AC impedance to ground for the yoke extension coil $W_b$. A retrace capacitance is switched by diodes D2, D3, which are coupled to the transistor switch Q3 via the auto-transformer winding $W_a$. Switch transistor Q3 is coupled to MOS transistor Q4 which is driven by transistor Q5. Transistor Q5 is coupled to an aspect ratio display selector switch S1.

When the 16:9 mode is selected, the low side of the horizontal deflection yoke $L_h$ is connected to a reference potential, which in this embodiment is ground, by the collector of saturated switch transistor Q3. The collector of transistor Q3 is also connected to the junction of windings $W_a$ and $W_b$ of auto-transformer $L_1$, which when transistor Q3 is saturated, is also grounded. The other end of winding $W_b$ is AC short-circuited to ground by the capacitor C6, 10 microfarads. Hence, due to transformer action, winding $W_a$ presents a short-circuit which clamps the cathode of diode D3 to ground potential. Diodes D2 and D3 clamp the junction of capacitors C4 and C5 to ground potential. Thus, capacitor C5 is short-circuited by diodes D2 and D3, and deflection circuit retrace time is determined by the series combination of capacitors C2, C3 in parallel with capacitor C4. Picture width and raster correction are adjusted in the 16:9 mode via the E-W control circuit to obtain a full screen 16:9 display.

In the 4:3 display mode, transistor Q3 is turned off causing the deflection current to flow through the yoke extension winding $W_b$ and capacitor C6, which results in a reduction in the deflection current amplitude. The retrace voltage at the junction of $W_a$ and $W_b$ is stepped-up by winding $W_a$ producing a reverse bias across diode D3 during retrace. Thus, with diode D3 off, capacitor C5 is switched in series with capacitor C4 reducing the overall retrace capacitance. This reduction in retrace capacitance compensates for the increased deflection circuit inductance resulting from the addition of winding $W_b$ in series with the deflection yoke $L_1$. The overall result is a constant retrace time when switching between 16:9 and 4:3 aspect ratios.

Figure 3:
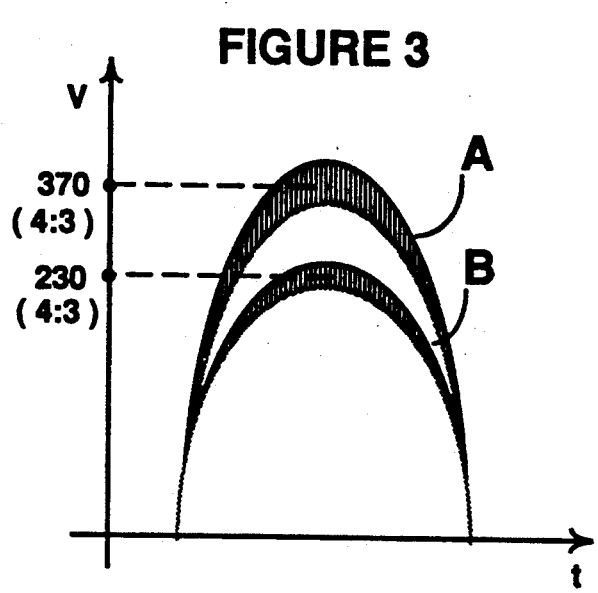
FIG. 3 depicts the retrace voltage waveforms a points A and B in FIG. 2.

Because of the series connected retrace capacitors C2 and C3, the change in retrace capacitance required to compensate for the inductance switching results in the voltage divider, formed by the series connection of capacitors C4 and C5, producing a greater retrace pulse amplitude than that developed at the junction of $W_b$ and $L_h$. To prevent diode D3 from conducting at the retrace peak it is necessary to apply a larger reverse bias retrace pulse to the cathode of diode D3. Hence, the step-up auto-transformer L1 formed by windings $(W_a+W_b)/W_b$ develops approximately 150% pulse amplitude which is sufficient to reverse bias diode D3. This difference in retrace voltages is shown in FIG. 3. Waveform A depicts the retrace voltage waveform at A, the junction of capacitors C4 and C5, waveform B shows retrace voltage at the junction of windings $W_a$, $W_b$. The shading on both waveforms indicates the presence of the E-W parabolic amplitude modulation.

To prevent the development of a negative voltage across transistor Q3, capacitor C6 is charged positively by clamping the trace voltage at the junction of windings $W_a$ and $W_b$ by diodes D2 and D3 and the integrated diode within transistor Q3. This produces a positive DC voltage of about 60 volts across capacitor C6.

Figure 4:
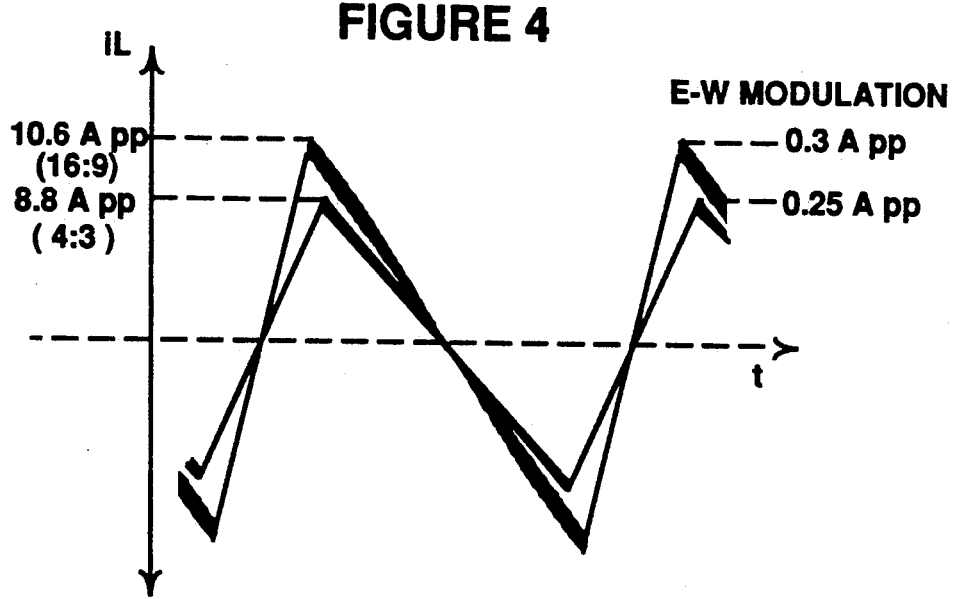
FIG. 4 depicts the current iL in deflection yoke $L_h$.

The deflection current amplitude is reduced to the 4:3 aspect ratio by the insertion of winding $W_b$ and by the reduced circulating energy due to the lowered retrace capacitance. The amount of "S" shaping is reduced in proportion with the reduction in deflection current resulting from the inclusion of winding $W_b$. An alternative explanation is that the additional inductance lowers the tuning of the series deflection circuit formed by the "S" capacitor and the deflection yoke which results in a lower frequency correction waveform i.e. one having less curvature at the extremities and hence less "S" correction. FIG. 4 depicts the deflection current iL waveforms for both 16:9 and 4:3 deflection widths. The relative amount of the raster correction remains constant because the retrace voltage across transistor Q2 remains unchanged when switching from 16:9 to 4:3. Thus the peak to peak raster correction current is reduced in proportion with the deflection current reduction. As an advantageous result, the raster geometry remains correct when the deflection is switched between 16:9 to 4:3 aspect ratio.

The deflection sensitivity increases towards the edges of the picture tube requiring "S" shaping of the deflection current. Switching from 16:9 to 4:3 requires a reduction of the scanning amplitude of 25%. However, due to the "S" shaping required for this particular tube, the deflection current is reduced by 18%. The indicated value of the extension coil Wb, is therefore 18% of the sum of the inductances of the yoke Lh and the unsaturated linearity coil Llin.

When operating in the 4:3 display mode, as a consequence of reducing the deflection width, the start of horizontal scan will be no longer be obscured by horizontal overscanning. Thus any scan ringing or other perturbations will be visible as vertical striations on the left edge of the picture. The circuitry shown FIG. 1 element 400 compensates for the effect of stray capacitance which resonates with the deflection yoke, resulting in retrace current flow after cessation of the retrace pulse. The stray capacitance exists between the deflection yoke and other adjacent components. The circuitry of element 400 is equally applicable to operation with other aspect ratios, where it will permit the use of less horizontal overscanning which results in a brighter picture with less image obscuration.

In the 16:9 mode, the base current required to saturate transistor Q3 is generated by winding W2 of flyback transformer T1. The positive retrace pulses from winding W2 are coupled via diode D5, resistor R6, and inductor L2, the saturated transistor Q4 to the base-emitter junction of transistor Q3. Inductor L2 stores energy from the retrace current flow, which during trace time provides base current for transistor Q3 via diode D4 and transistor Q4. Inductor L2 is almost short circuit by diode D4 and transistor Q3 during trace. The current decay during trace is therefore small. Consecutive retrace pulses replenish the energy in inductor L2 resulting in a DC base current of 2 amps.

In the 4:3 mode, aspect ratio selection switch S1 is open and resistor R9 charges capacitor C8 to a positive voltage causing transistor Q5 to saturate. With transistor Q5 saturated, the near ground potential at the collector is coupled via resistor R7 to MOS transistor Q4 which turns off. The source of transistor Q4 is coupled to ground via resistor R5, and to the base of bipolar transistor Q3, which also becomes cutoff. Resistor R4 damps inductor L2 to avoid voltage peaks across Q4. The voltage across capacitor C6 reverse biases diode D5. Resistors R1 and R2 provide discharge paths for capacitors C5 and C6 and define the DC voltage applied thereto. Damping network resistor R3 and capacitor C7 prevent parasitic oscillations at the junction of horizontal deflection yoke Lh and auto-transformer L1.

In the 16:9 display mode, aspect ratio selection switch S1 is closed, coupling the flyback transformer winding W2 to diode D7 and capacitor C8 which develop a negative potential that turns off transistor Q5. Transistor Q5 collector is connected to a positive supply, via resistor R8, and to the junction of a zener diode D6 cathode and a resistor R7. Resistor R7 is coupled to the gate electrode of MOS transistor Q4. Thus, with transistor Q5 off, current is provided from the positive supply via resistor R8 to zener diode D6, which provides a positive voltage to the gate of transistor Q4, via resistor R7, causing transistor Q4 to saturate. Saturated transistor Q4 couples the positive potential on capacitor C6 via resistor R4, to the junction of resistor R5 and the base of switch transistor Q3 causing it to saturate and effectively ground the junction of the horizontal deflection yoke and the auto-transformer L1 tap.

The ground at auto-transformer L1 tap also provides a discharge path for capacitor C6, the source of transistor Q3 base current. However, base current for transistor Q3 is sustained by rectified retrace pulses from winding W2. These pulses are coupled via resistor R6, diode D5, inductor L2. During trace time, energy stored in inductor L2 sustains transistor Q3 base current via diode D4, resistor R5 and transistor Q4.

Smooth switching between formats is achieved by the control of transistor Q3. In the 4:3 mode, capacitor C6 is charged positively by the trace voltage clamping via diodes D2, D3 and transistor Q3 antiparallel diode. When switching from 4:3 to 16:9 display format, switch S1 closes, controlling the base current as explained previously. Capacitor C6 discharges completely via resistor R10, and transistors Q3 and Q4.

Switch S1 can be an electronic switch which may be activated by a control signal generated or derived from a program format identification circuit.

Inventive arrangements can be adapted to other television scanning frequencies and/or to any other aspect ratio or underscan.

What is claimed is:

1. A cathode ray tube display system, comprising: a cathode ray tube and a deflection yoke positioned thereon; deflection means coupled to said yoke for generating deflection current therein to scan a raster on a screen of said tube, said deflection means having at least two selectable conditions each of deflection current amplitude and a deflection circuit parameter, where, in the first selectable condition, a first deflection amplitude and a first value of said parameter corresponds to a first aspect ratio of said raster, and in a second selectable condition, a second deflection amplitude and a second value of said parameter corresponds to a second aspect ratio, different than said first.

2. The display system in claim 1, wherein said selectable deflection circuit parameter is one of a retrace parameter and an S shaping parameter.

3. The display system in claim 1, wherein said yoke is coupled in shunt between said deflection means and a reference potential such that the yoke voltage is non-floating and referenced to the reference potential.

4. The display system in claim 3, wherein said yoke is selectably coupled between AC ground and said reference potential.

5. The display system in claim 3, wherein said deflection means further comprises a switch coupled to said yoke and said reference potential and operable to select between said first and second selectable condition.

6. The display system in claim 5, further comprising an inductance coupled in shunt with said switch, such that conduction of said switch causes said deflection current to be conducted to said reference potential via said switch, and non-conduction of said switch causes said deflection current to be conducted to said reference potential via said inductance.

7. The display system in claim 6, further comprising a retrace capacitance selectively coupled to said inductance responsive to said switch.

8. The display system in claim 6, further comprising an S correction capacitance being resonantly coupled to said yoke and inductance, the resonant coupling being changed responsive to said switch to vary the amount of S correction of said deflection current.

9. The display system in claim 1, wherein said first selectable condition corresponds to an aspect ratio of 16:9 and said second selectable condition corresponds to an aspect ratio of 4:3.

10. The display system in claim 1, further comprising an inductance coupled in series with said yoke, such that in said first selectable condition, said inductance is short circuited and in said second selectable condition, said deflection current is conducted via said inductor.

11. The display system in claim 1, further comprising a retrace capacitance arrangement resonantly coupled with said yoke and a deflection current amplitude controlling inductance, and having capacitance values selected in accordance with said first and second selectable conditions.

12. The display system in claim 1, further comprising an S correction capacitance being coupled with said yoke and said deflection current amplitude controlling inductance to form a resonant circuit having different resonant frequencies in accordance with said first and second selectable conditions.

13. A deflection apparatus, comprising:
a deflection winding;
deflection means coupled to said deflection winding for generating a deflection current therein;
an auto transformer having a first winding and a second winding joined at a tap, said deflection winding being coupled to said tap, and said second winding being coupled to a reference conductor;
a retrace circuit coupled to said deflection winding, including a retrace capacitance coupled to said first winding of said auto transformer; and
switching means coupled to said auto transformer tap, where in a first switching condition said tap is coupled to said reference conductor to short circuit said second winding, and in a second switching condition, said second winding is not short circuited, to thereby control said deflection current amplitude responsive to said switching means.

14. A deflection apparatus, comprising:
a deflection winding;

deflection means coupled to said winding for generating a deflection current therein;

an S correction capacitance resonantly coupled to said winding;

an inductance coupled to said winding; and switching means coupled to said deflection winding and said inductance such that a first conductive state of said switching means produces a frequency increase of said resonant coupling and produces a first value of deflection current and S correction and a second conductive state reduces the frequency of said resonant coupling and produces a second value of deflection current and S correction.

15. A deflection apparatus, comprising:

a deflection winding;

deflection means coupled to said deflection winding for generating a deflection current therein;

an inductance selectably coupled to said deflection winding to control amplitude of deflection current;

a first retrace capacitance resonantly coupled to said deflection winding; and a second retrace capacitance selectably coupled to said first retrace capacitance to thereby maintain substantially constant retrace duration.

16. A deflection apparatus, comprising:

a deflection winding;

deflection means coupled to said deflection winding for generating a deflection current therein;

an east-west deflection correction circuit coupled to said deflection means;

a flyback transformer coupled to said east-west correction circuit, and having an ultor supply substantially unchanged with east-west deflection correction;

means coupled to said deflection means for controlling the amplitude of said deflection current; and switching means coupled to said amplitude control means for switching between two different deflection current amplitudes without producing significant ultor supply change.

17. A deflection apparatus, comprising:

a deflection winding;

deflection means coupled to said deflection winding for generating a deflection current therein;

a transformer having a first and a second winding, said first winding being coupled to said deflection winding;

a retrace circuit coupled to said deflection winding, including a retrace capacitance coupled in shunt to ground with said deflection winding and coupled to said second winding of said transformer;

a first switching means coupled to said transformer to control the deflection current amplitude in accordance with the switching thereof; and a second switching means coupled to said transformer second winding for selecting retrace capacitance value responsive to deflection amplitude selection thereby maintaining a substantially constant retrace duration.

18. A deflection apparatus, comprising:

a deflection winding;

deflection means coupled to said deflection winding for generating a deflection current therein;

an auto-transformer having a first and a second winding, said first winding being coupled to said deflection winding;

a retrace circuit coupled to said deflection winding, including a retrace capacitance coupled to said second winding of said transformer; and switching means coupled to said transformer to control the deflection current amplitude in accordance with the switching thereof.

19. A deflection apparatus, comprising:

a deflection winding;

deflection means coupled to said deflection winding for generating a deflection current therein, said deflection winding being coupled in shunt between said deflection means and a reference potential such that said deflection winding voltage is non-floating and referenced to said reference potential;

a transformer having a first and a second winding, said first winding being coupled to said deflection winding;

a retrace circuit coupled to said deflection winding, including a retrace capacitance coupled to said second winding of said transformer; and switching means coupled to said transformer to control the deflection current amplitude in accordance with the switching thereof.

20. An apparatus as claim 19, wherein said deflection winding is selectably coupled between AC ground and said reference potential.

* * * * *